United States Patent [19]
Abadi et al.

[11] Patent Number: 5,268,962
[45] Date of Patent: Dec. 7, 1993

[54] COMPUTER NETWORK WITH MODIFIED HOST-TO-HOST ENCRYPTION KEYS

[75] Inventors: Martin Abadi; Michael Burrows, both of Palo Alto, Calif.; Butler Lampson, Cambridge, Mass.

[73] Assignee: Digital Equipment Corporation, Maynard, Mass.

[21] Appl. No.: 917,870

[22] Filed: Jul. 21, 1992

[51] Int. Cl.⁵ .......................... H04L 9/08; H04L 9/06
[52] U.S. Cl. ........................................ 380/21; 380/25; 380/29; 380/49
[58] Field of Search ....................... 380/21, 25, 29, 49

[56] References Cited

U.S. PATENT DOCUMENTS 5,081,678  1/1992  Kaufman et al. ..................... 380/21

*Primary Examiner*—Mark Hellner
*Attorney, Agent, or Firm*—Flehr, Hohbach, Test, Albritton & Herbert

[57] ABSTRACT

In a computer network, each pair of host computers that need to exchange data packets establish a single host-to-host encryption/decryption key. Then, whenever one host computer sends a data packet to the other host computer, it first forms a predefined logical combination of the established host-to-host key and the destination buffer index to which the data packet is being sent, and then uses the resulting value to encrypt the secure portions of the data packet. The destination buffer index is included in the data packet's header, which is not encrypted. When the receiving host computer receives the encrypted data packet, it reads the destination buffer index from the packet header, forms the same predefined logical combination of the established host-to-host key and the destination buffer index to generate a decryption key, and uses the computed decryption key to decrypt the secure portions of the received data packet. If the destination buffer index in the received data packet has been modified either by noise or by an interloper, the decryption key computed by the receiving host computer will be different from the encryption key used by the sending host computer, and therefore the portions of the received data packet decrypted using the computed decryption key will be unintelligible. Thus, interlopers are prevented from breaching the confidentiality of encrypted data.

26 Claims, 6 Drawing Sheets

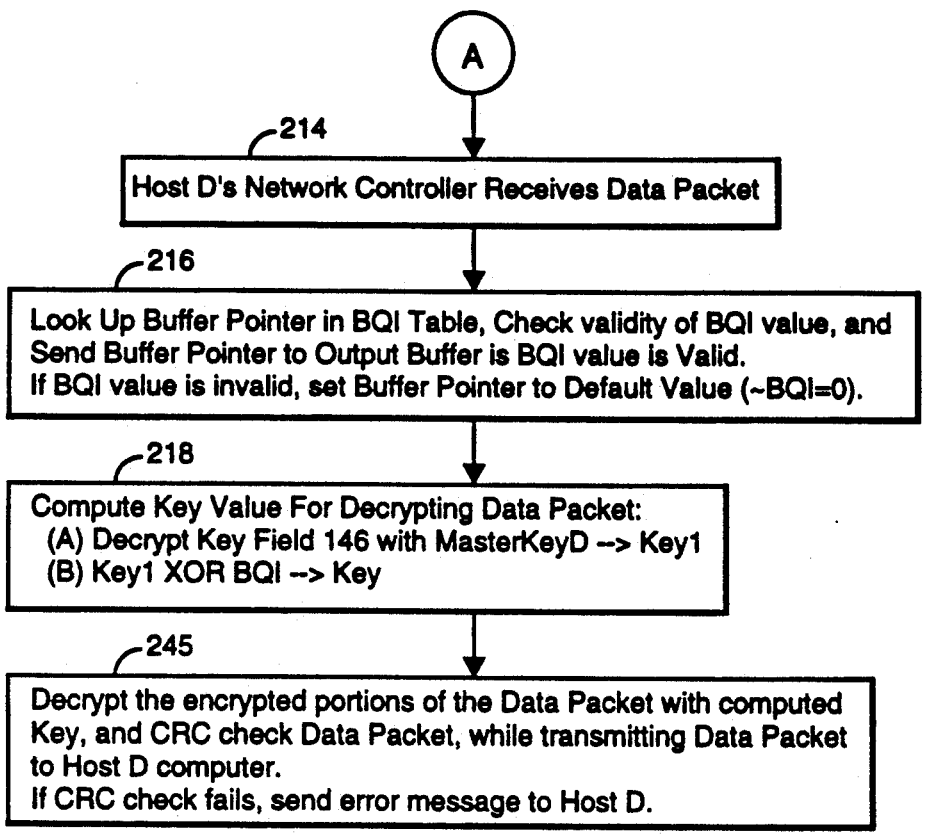
FIGURE 5B
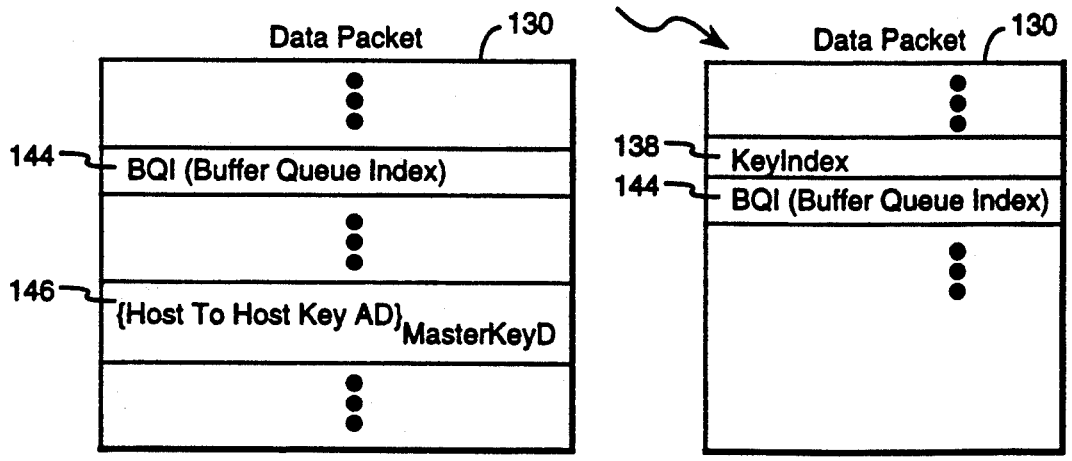
FIGURE 4     FIGURE 7

COMPUTER NETWORK WITH MODIFIED HOST-TO-HOST ENCRYPTION KEYS

The present invention relates generally to computer communication networks in which data packets are transmitted between network nodes, and particularly to a computer network in which a single host-to-host encryption/decryption key established for each pair of host computers is modified in a predefined fashion for each transmitted data packet so as to thwart attempts to change the destination information in data packets.

BACKGROUND OF THE INVENTION

In FIG. 1 is shown a small portion of a computer network 100 in which data packets are transmitted from host computers 102, 104 and 106, through switches 110 and 112 to host computer 114. For the purposes of this discussion, it can be assumed that the host computers are multi-user or multitasking computers with operating systems that support multiple user address spaces.

The receiving host computer 114 has a network controller 116 for receiving data packets, which decrypts and error checks those data packets. The network controller 116 delivers each received, decrypted data packet to one of several buffers queues 118-1 to 118-N in the receiving host computer's memory in accordance with a BQI (buffer queue index) value found in the data packet's header. Each buffer queue 118 is associated with a different user address, and the delivery mechanism used by the network controller 116 is preferably a DMA (direct memory access) transfer.

As shown in FIG. 2, each data packet 130 transmitted through the network has a packet header 132 and a packet body 134. Information typically found in the packet header 132 includes a network destination address 136 that indicates where the packet is being sent, source identification data 138 that indicates where the data packet 130 originated, a packet type value 140, an offset value 142 indicating the position of the boundary between the encrypted portion 143 of the data packet and the unencrypted portion of the data packet 130, and a buffer queue index (BQI) value 144. The BQI value 144 in each packet header specifies which of the buffer queues 118 in the destination host computer the data packet should be sent to. In one of the two preferred embodiments, the data packet header 132 also includes an encrypted key value 146, the origin and purpose of which will be described below.

Data packets are usually encrypted using a private key encryption methodology, such as DES CBC. Furthermore, to ensure data integrity, a CRC error detection code 148 is included in each packet, usually at the end of the data packet, for detecting corrupted packets as well as for detecting packets that may have been tampered with in an attempt to break the system's security provisions. Therefore each packet received by the network controller 116 must be decrypted and error checked by a CRC (cyclic redundancy check) circuit before it can be used by the host computer 114.

The problem addressed by the present invention is as follows. When an encrypted packet arrives at a network controller 116, it is useful to use "cut through" packet processing, which means that the controller 116 begins storing the beginning of the data packet in the host computer's memory at specified buffer location in a user address space before the end of the data packet has been received. Since the CRC check on the packet cannot completed before the end of the data packet has been received, this means that cut-through packet processing results in at least a portion of the data packet being delivered into a user's address space before the CRC check can determine whether or not the packet has been tampered with or otherwise corrupted. On the other hand, it is unacceptable to deliver a decrypted data packet to the wrong buffer queue 118 in the host computer, because that might disclose confidential information to a user not authorized to access that information. In other words, it is important for security reasons that a data packet not be delivered to the wrong address if it is correctly decrypted.

If the network controller 116 could CRC check the entire data packet before delivery of the data packet to a user's address space, the problem presented above would not exist, but the advantages of cut-through packet processing would be lost.

Referring to FIG. 1, if an interloper 150 compromises the security of the computer network using a mechanism 152 that replaces the original BQI value 144 in a data packet with a different BQI value, the network controller 116 at the destination host computer 114 will deliver the data packet to the wrong buffer queue in the host computer. Data packets can also be misdirected if the BQI value 114 in the data packet is corrupted by noise during transmission.

In many computer systems, all data packets transmitted between two host computers are encrypted using a single "host-to-host" key that has been agreed upon by the two host computers. Since exchanging and managing keys is typically a resource intensive process, using only one key exchange for each pair of hosts is efficient.

Using the DES CBC (cipher-block-chaining) encryption scheme, which is well known to those in the field, partial replacement of an encrypted packet with new data will not cause the packet decryption process to fail. In other words, portions of the packet will still be decrypted correctly. Clearly, in the context of the interloper scenario shown in FIG. 1 this is not an acceptable result, because the interloper will be able not only to have the packet rerouted to the wrong buffer queue, but the rerouted packet will be correctly decrypted, at least in part, giving the wrong user on the host computer 114 access to potentially confidential information.

The goal of the present invention is to prevent misdelivered data packets, or data packets with destination buffer values that have been modified after initial transmission of the data packet, from being successfully decrypted. Delivery of unintelligible "garbage" data packets, such as data packets "decrypted" using the wrong decryption key, does not constitute a security breach.

SUMMARY OF THE INVENTION

In summary, the present invention is a system and method for preventing data packets whose destination buffer values have been modified after initial transmission of the data packet from being properly decrypted. Each pair of host computers that need to exchange data packets establish a single host-to-host encryption/decryption key. Then, whenever one host computer sends a data packet to the other host computer, it first forms a predefined logical combination of the established host-to-host key and the destination buffer index to which the data packet is being sent, and then uses the resulting value to encrypt the secure portions of the data packet. The destination buffer index is included in the data packet's header, which is not encrypted. When the receiving host computer receives the encrypted data packet, it reads the destination buffer index from the packet header, forms the same predefined logical combination of the established host-to-host key and the destination buffer index to generate a decryption key, and uses the computed decryption key to decrypt the secure portions of the received data packet.

If the destination buffer index in the received data packet has been modified either by noise or by an interloper, the decryption key computed by the receiving host computer will be different from the encryption key used by the sending host computer, and therefore the portions of the received data packet decrypted using the computed decryption key will be unintelligible. Thus, the present invention prevents interlopers from breaching the confidentiality of encrypted data.

BRIEF DESCRIPTION OF THE DRAWINGS

Additional objects and features of the invention will be more readily apparent from the following detailed description and appended claims when taken in conjunction with the drawings, in which:

FIG. 4 is a block diagram of a data packet used in conjunction with the network controller of FIG. 3.

FIGS. 5A and 5B are a flow chart of the steps of the method of the present invention when used in conjunction with the network controller of FIG. 3.

FIG. 7 is a block diagram of a data packet used in conjunction with the network controller of FIG. 6.

DESCRIPTION OF THE PREFERRED EMBODIMENTS

We will first describe the manner in which host-to-host encryption keys are established. Then the processing of transmitting and receiving data packets will be described.

FIRST PREFERRED EMBODIMENT OF NETWORK CONTROLLER

Figure 1:
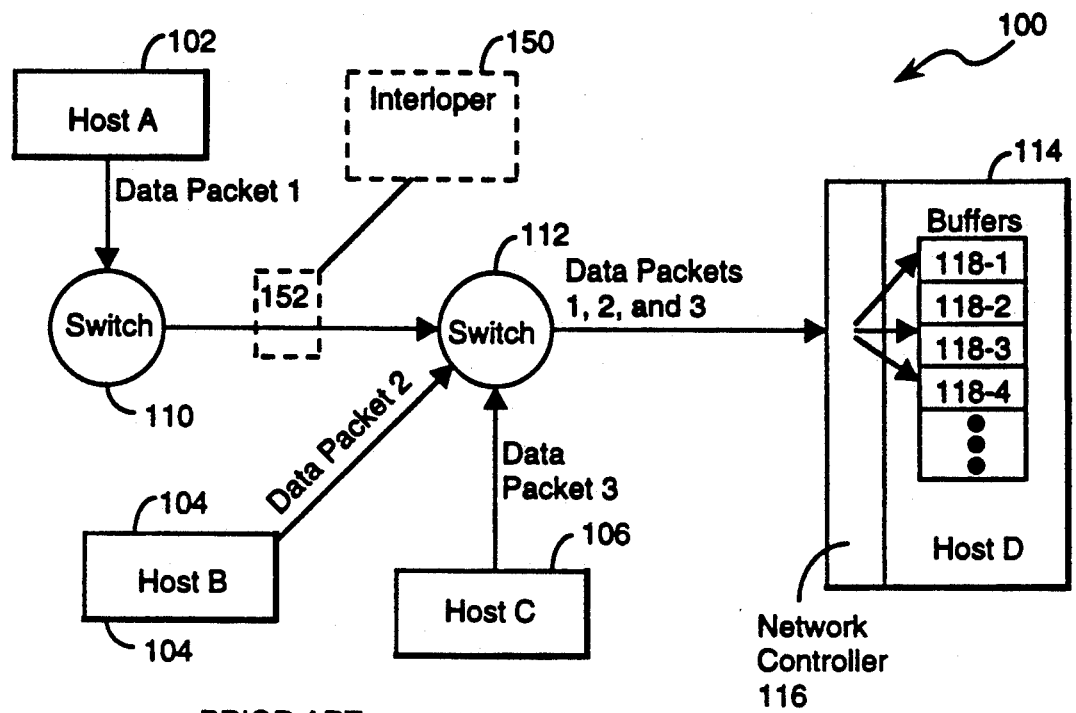
FIG. 1 is a block diagram of a portion of a computer network showing the data path of a data packet from a sending host computer to a destination host computer.
Figure 2:
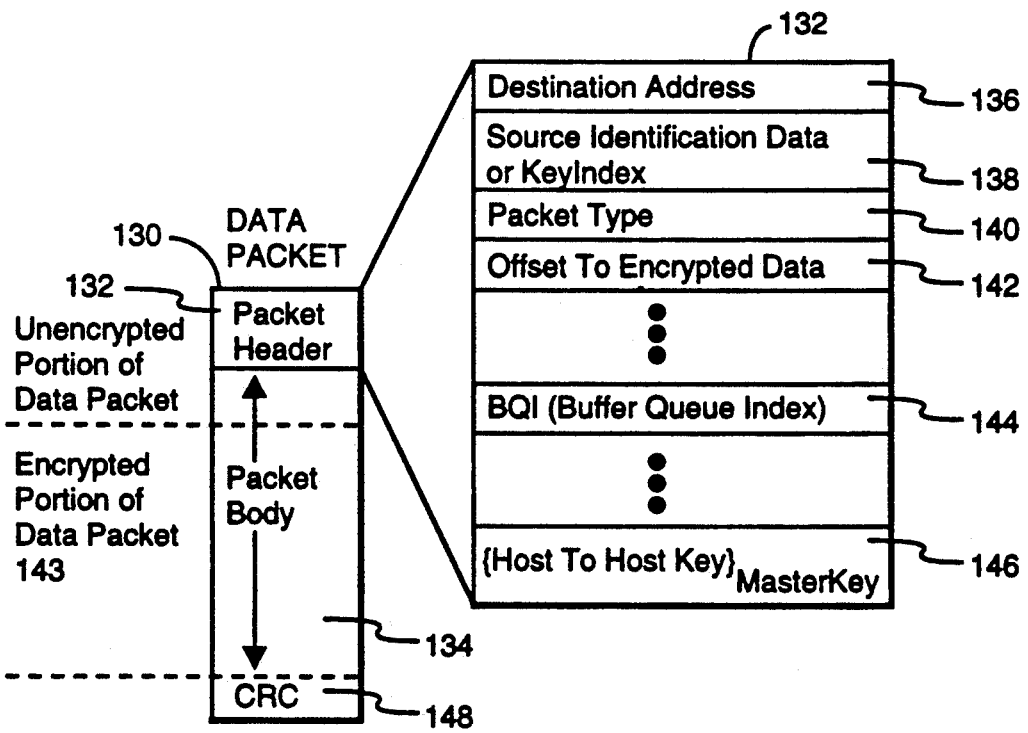
FIG. 2 is a block diagram of a data packet and the data packet's header.

Referring to FIGS. 1 and 4, the prior art provides any number of mechanisms for distributing encryption keys in a network. One such methodology developed at the Massachusetts Institute of Technology is known as KERBEROS. Other methodologies are known as public key systems. In any case, in the context of the present invention, any two host computers that will transmit data packets therebetween must first agree on a "host-to-host" encryption key that will used to encrypt the secure portions of data packets transmitted between those two computers.

Typically, a different host-to-host key will be established for every distinct pair of host computers in the system 100. The methodology used to exchange such keys is not critical to the present invention. What is important is that only one host-to-host key needs to be established between each pair of computers, because the exchange of such keys is typically expensive in terms of the system resources used. For instance, it would be much more burdensome to require that every pair of users in the system exchange a unique encryption key.

Exchanging and Storing Host-to-Host Encryption Keys

Figure 3:
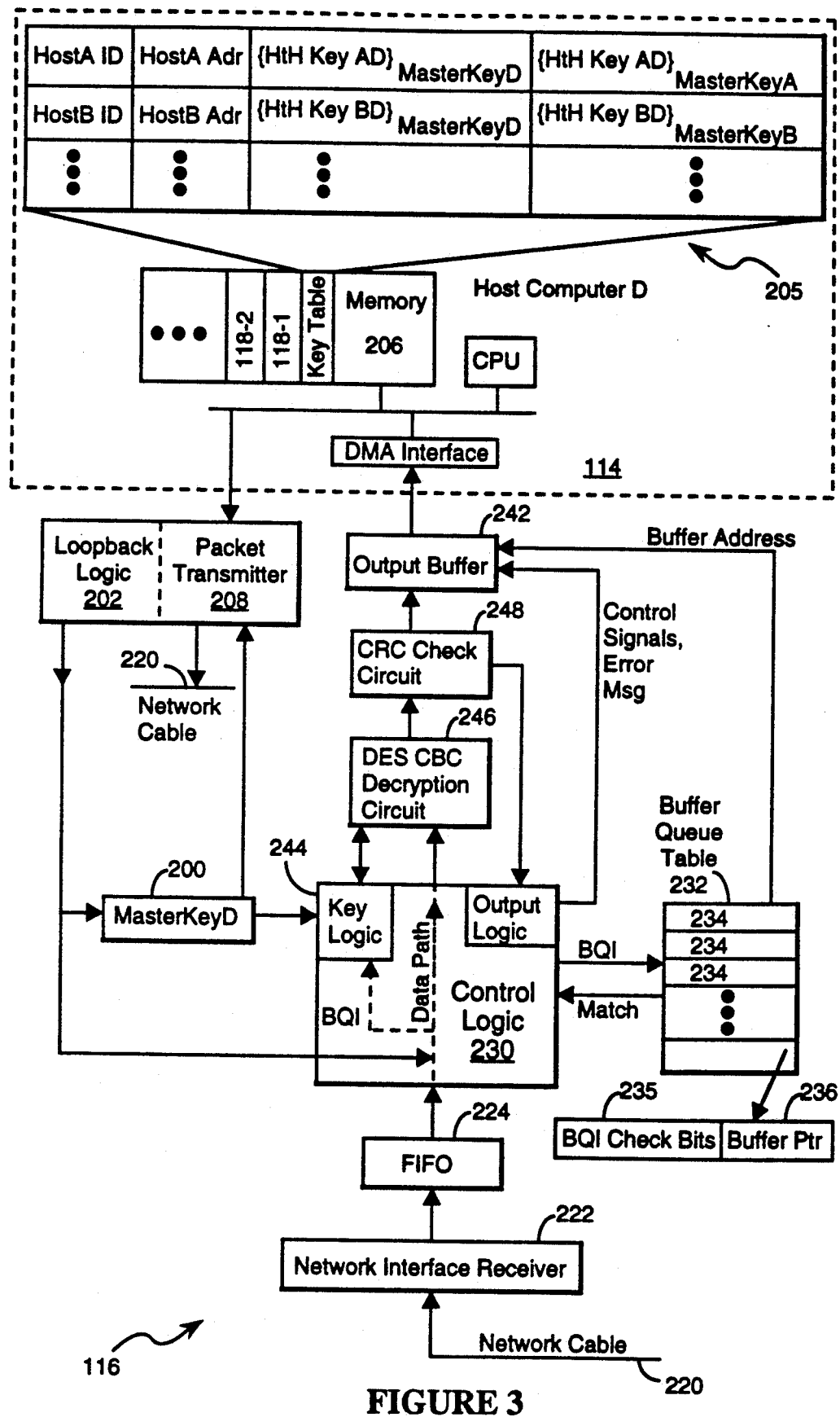
FIG. 3 is a block diagram of a first network controller which generates buffer dependent decryption keys in accordance with the present invention.

Referring to FIG. 3, each host computer's network controller 116 has an internal memory register 200 that stores a resettable Master Key value. In the preferred embodiment, the Master Key is settable by the host computer 114, but is not readable by the host computer 114. Each time that the host computer 114 is powered on or reset (i.e., each time that the host goes through its boot sequence), it uses a random number generator (preferably fed or driven by an unpredictable physical source) to generate a master key. The master key is then downloaded into the network controller 116 (e.g., via the network controller's loopback logic 202), and then forgotten by the host. Thus, a new master key will be used each time that host computer boots.

Figure 5A:
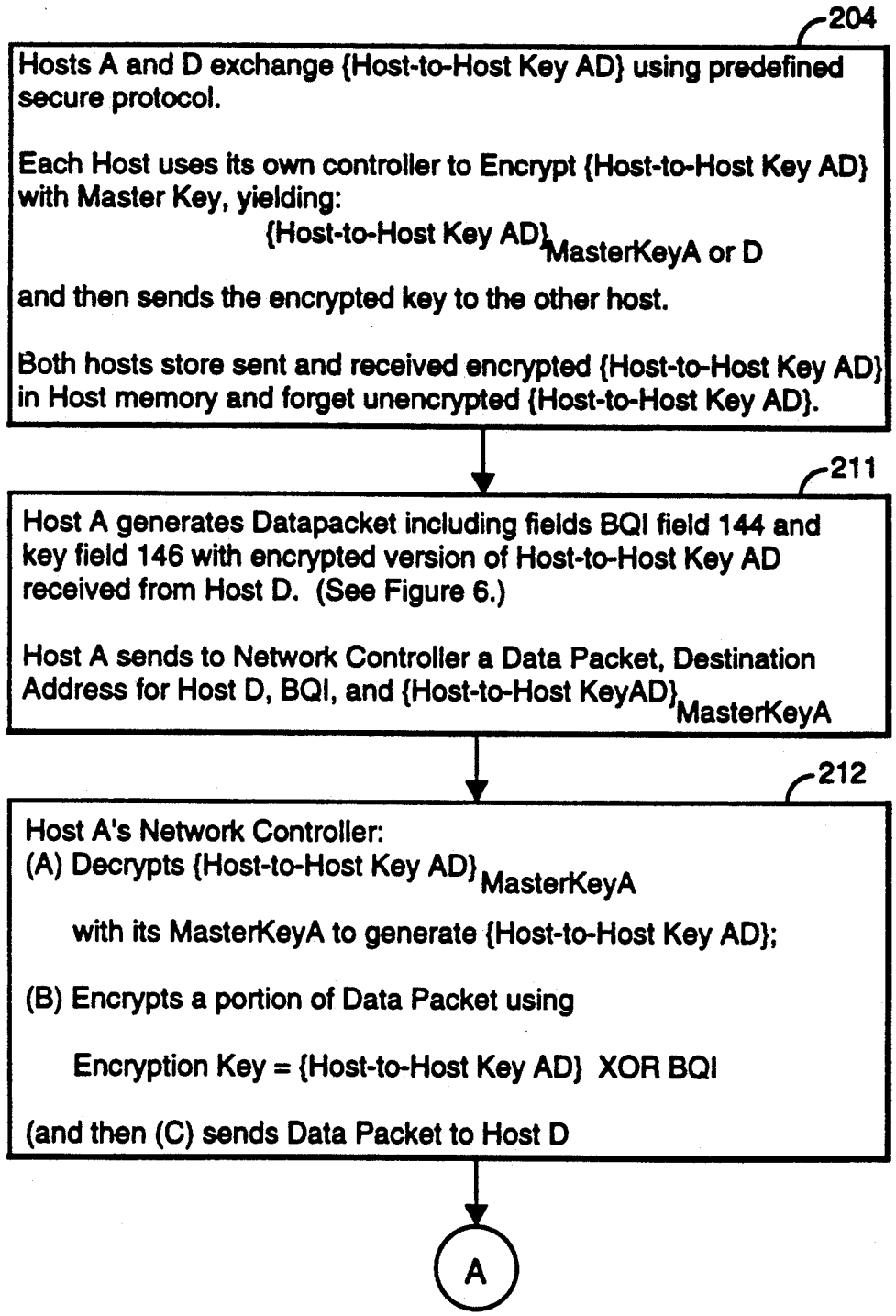

Before exchanging data packets with any other host computer, the host computer 114 must first establish a host-to-host key with that other host computer, using the sequence of operations shown as step 204 in FIG. 5A. When the host 114 establishes a host-to-host key (e.g., Host-to-Host Key AD in FIG. 3) with another host computer, each host uses its own network controller 116 to encrypt that key with its master key, generating values herein labeled {Host-to-Host Key AD}$_{MasterKeyD}$ and {Host-to-Host Key AD}$_{MasterKeyA}$, where MasterKeyD and MasterKeyA are the master keys of the network controllers for host computers D and A. The two host computer's exchange the encrypted keys, and then each host computer stores both encrypted versions of the host-to-host key in a Key Table 205 in its internal memory 206, along with values identifying the other host computer. Furthermore, to help ensure the security of the host-to-host key, both host computers A and D forget the agreed upon host-to-host key after storing its encrypted versions, and from then on use only the encrypted versions stored in Key Table 205.

Encrypting and Transmitting Data Packets

FIG. 4 shows that data packets 130 used with the first preferred embodiment of the present invention include in the packet header the BQI 144 (which specifies the buffer queue 118 in the destination host computer the data packet should be sent to) and an host-to-host key 146 encrypted using the receiving network controller's master key.

FIG. 5A is a flow chart representing the steps performed, from the perspective of Host D 114, in order for Host A 102 to send a data packet 130 to Host D (see FIG. 1). Step 204, described above, comprises the exchange of a host-to-host key, identified here as "Host-to-Host Key AD". This process of exchanging a host-to-host key, and its encrypted version, with another host computer's controller is repeated for each host computer with which Host D 114 will exchange data packets.

Whenever Host A's controller 116 transmits a data packet to another host computer i (using the packet transmitter 208 portion of the network controller 116), the encrypted key value {Host-to-Host Key Ai}$_{MasterKeyi}$ is stored in the packet header 132 at slot 146, as shown in FIG. 4. The advantage of including this encrypted key value in the transmitted data packet is that the receiving host's network controller can compute the key value needed to decrypt the received data packet simply by applying decrypting this key value 146 using its own master key.

In the example process of FIG. 5A, at step 211 Host A sends to its network controller an unencrypted data packet including a destination address field 136, the BQI field 144 and the encrypted version of Host-to-Host Key AD received from Host D. Host A also sends to its network controller the version of Host-to-Host Key AD encrypted by its own network controller, herein labelled {Host-to-Host Key AD}$_{MasterKeyA}$. At step 212, Host A's network controller decrypts the {Host-to-Host Key AD}$_{MasterKeyA}$ value to regenerate the encryption key {Host-to-Host Key AD}.

In the preferred embodiment, when a Host A 102 transmits a data packet to Host D 114, Host A selects a BQI value based on the user in Host D to whom the message is being sent (step 211). The packet transmitter (208) in Host A's network controller encrypts a portion 143 of the data packet using an encryption key computed by exclusive ORing the regenerated host-to-host key for that pair of computers with the data packet's BQI value 144:

Encryption key=(Host-to-Host Key AD) XOR BQI

The use of an XOR operation for generating the modified encryption key is particularly efficient when using DEC CBC encryption because the DEC CBC encryption technique already requires the ability to perform XOR operations.

In alternate embodiments, the encrypiton key could be computed using any predefined logical combination of the host-to-host Key and the BQI value, such as the value obtained by adding the two values together, the value obtained by subtracting the two values, logically ORing the two values, performing various bit rotations or bit shifts on either one of the two values prior to logically combining them, and so on. In fact, in the process of "logically combining" these two values, either one or both could be converted using a table look-up or hard-wired converter to make the key generation process harder for interlopers to replicate.

After encrypting portion 143 of the data packet using the computed encrypting key, Host A's network controller 116 transmits the resulting data packet to Host D via the communications network (step 212).

Decrypting and Delivering Received Data Packets

Referring to FIG. 3 and 5B, when Host D's controller 116 receives a data packet (step 214) from network cable 220, the data within the packet is sequentially captured by a network interface receiver 222 and then temporarily stored in a FIFO (first in first out) buffer 224. Control logic 230 reads the header of each received data packet from the FIFO 224 in order to process the BQI value (step 216) and to generate a decryption key (step 218).

The BQI value 144 in the preferred embodiment is a 64-bit value, but only the first N bits (e.g., ten bits), called the BQI prefix, are actually used to identify a buffer queue in the host computer. The remaining 64 minus N bits are used to verify that the BQI value in the packet header is valid. The network controller 116 includes a buffer queue table 232, which is essentially an internal memory array that stores a record 234 for each possible N-bit BQI prefix value. Each record 234 contains two items: a set of 64-N "check bits" 235 that will match the last 64-N bits of the BQI value if the BQI value is valid, and a buffer pointer 236, which is the buffer queue address in the host computer's memory 240 associated with a particular user.

To verify the BQI value 144 in a particular packet, the control logic 230 retrieves the record 234 in the buffer queue table 232 corresponding to the BQI prefix. In other words, the control logic 230 uses the BQI prefix to address one record 234 in the table 232. It then compares the BQI check bits 235 from that record with the corresponding bits of the packet's BQI value, and if they match, indicating that the BQI value is valid, then the control logic 230 loads the buffer pointer 236 from that record into the output buffer 242. If the comparison of the BQI check bits determines that the BQI value is invalid, the data packet is delivered to a special buffer queue (e.g., the buffer queue associated with BQI=0). See step 216 in FIG. 4. Software in the host computer can then decide whether to discard or otherwise handle data packets with invalid BQI values.

After processing the BQI value, the next step is to generate a decryption key for decrypting the encrypted portion 143 of the received data packet. In the preferred embodiment, a key logic circuit 244 within the control logic 230, performs a two step process to generate the decryption key. The first step (A) of this process is to decrypt the encrypted key 146 in the data packet using its own Master Key. The second step (B) is to then compute the decryption key to be used with this packet by logically combining the decrypted host-to-host key value with the BQI value for the packet, using the same key generation function as the sending host's network controller. In the preferred embodiment, where the XOR operation is used to generate the encryption key, the decryption key generation function is:

Decryption key=(decrypted Host-to-Host Key) XOR BQI

See step 218 in FIG. 4. Thus a different decryption key is generated for data packets from the same host computer if their BQI values are different (i.e., if their destination buffer queues in Host D are different).

Next, the control logic 230 initiates the process of transmitting the data packet to the host computer 114 (step 245 in FIG. 4). It should be remembered that at this point in time a portion 143 of the data packet is still encrypted, and furthermore that the data packet has not yet been error checked. The process of decrypting and error checking the data packet is pipelined so that it is performed as the data is transmitted to the host computer 114, preferably using DMA (direct memory access) data transmission. This is also known as cut-through processing of the data packet. In particular, the control logic 230 loads the computed decryption key into decryption circuit 246, and then routes the data packet through the decryption circuit 246. Under the control of control logic 230, the decryption circuit 246 passes the unencrypted portion of the data packet in unmodified form, and decrypts the encrypted portion 143 of the data packet. As portions of data packet emerge from the decryption circuit 246, they are error checked, in pipelined fashion, by CRC check circuit 248. In the preferred embodiment, the data packet is encrypted and decrypted using the DES CBC method.

From the CRC check circuit 248 the data packet is transmitted to the host computer 114 via an output buffer 242 that typically contains DMA logic circuitry for directly storing the data packet in the host computer's memory. While only a small amount of information is processed by the decryption and error checking circuits 246, 248 at any one time, the entire packet is sequentially processed by these circuits as the data packet is transmitted to the host computer 114.

The CRC check circuit 248 accumulates a CRC value for the entire data packet, and sends an error signal to the control logic 230 if the final CRC value indicates that the data packet contains invalid data. If the CRC circuit 248 determines that the packet has invalid data, the control logic 230 sends a special command to the output buffer 242, which then loads an error message into the memory of the host computer 114. This error message is sent to the host computer immediately after the end of the packet is sent. The host computer 114 is typically programmed to look for such error messages from the controller 116 in a particular portion of its memory and to discard any received packets that are flagged as being invalid by an error message.

However, it would be possible for a user to program the host computer to ignore CRC error messages, thereby allowing the user to access the delivered data packet. If an interloper had modified the data packet's BQI value, that would cause a CRC error to be detected. Since the programming in the host computer cannot be relied upon to discard data packets having CRC errors, however, the present invention causes the encrypted portions of the misdelivered data packet to be unintelligible, because those portions of the data packet are "decrypted" using a different key than the encryption key used by the packet's sender.

In summary, even though a single "host-to-host" encryption key is established for each pair of host computers, the actual encryption key used to encrypt each transmitted data packet is a logical combination of the established "host-to-host" encryption key and the packet's buffer queue index, which indicates the user or buffer queue in the destination host to which the packet is being sent. This technique prevents an interloper from receiving a decrypted data packet that was addressed to another user. If the interloper modifies the data packet's BQI in order to reroute the data packet to himself or any other user than the intended recipient, the receiving network controller will use an invalid decryption key to decrypt the encrypted portions of the data packet, which will cause the interloper to receive a garbled data packet that does not disclose the information in the encrypted portion of the data packet.

SECOND PREFERRED EMBODIMENT OF NETWORK CONTROLLER

Figure 6:
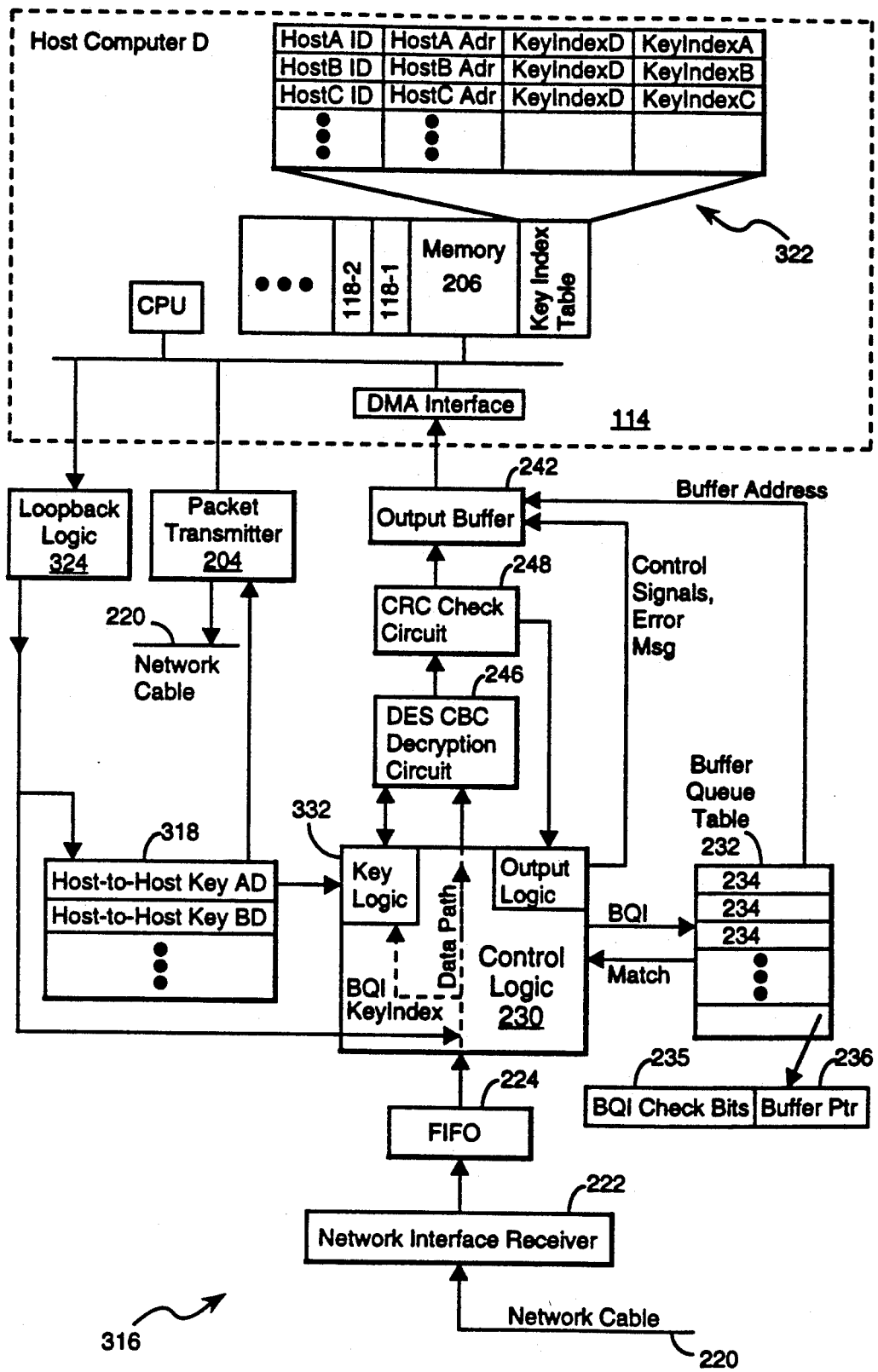
FIG. 6 is a block diagram of a second network controller which generates buffer dependent decryption keys in accordance with the present invention.
Figure 8:
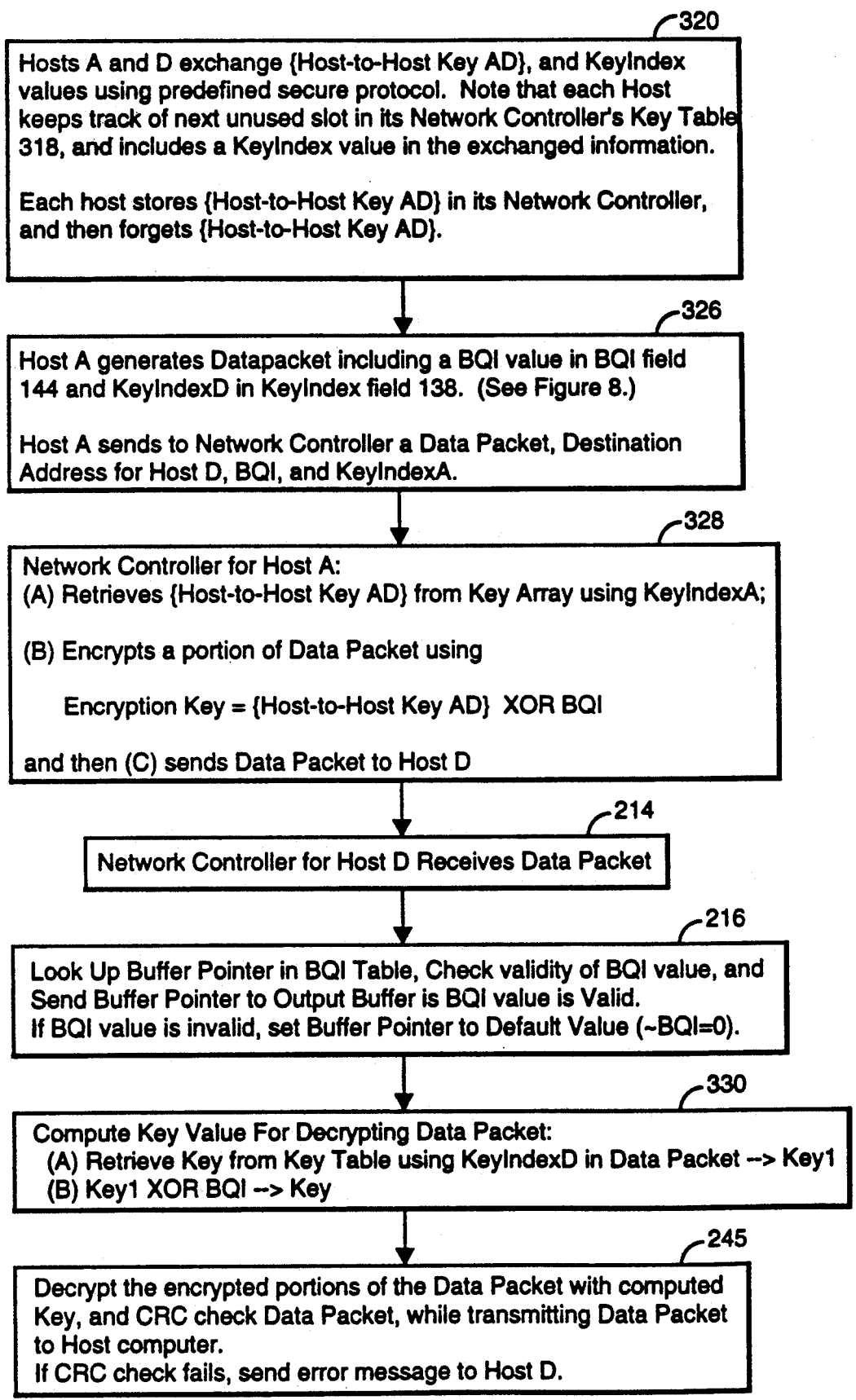
FIG. 8 is a flow chart of the steps of the method of the present invention when used in conjunction with the network controller of FIG. 6.

Referring to FIGS. 6, 7 and 8, only the differences between this second embodiment and the above-described embodiment will be described below. In the second preferred embodiment of the invention, the network controller 316 as shown in FIG. 6 does not have a master key stored in a register and the transmitted data packets (the header of which is shown in FIG. 7) do not include an encoded host-to-host key. Instead. The host-to-host keys are stored in a Key Table 318 in the network controller 316, and each data packet header includes a KeyIndex value in field 138 (see FIG. 7) indicating where in the receiving network controller's Key Table 318 the associated host-to-host key is located.

Establishing and Storing Host-to-Host Keys

As in the first preferred embodiment, before exchanging data packets with any other host computer, the host computer 114 must first establish a host-to-host key with that other host computer, using the sequence of operations shown as step 320 in FIG. 5A. As a preliminary matter, each host computer maintains a Key Index Table 322 for storing information concerning the host-to-host keys stored in its Network Controller's Key Table 318. Each time that the host computer is powered up or reset (i.e., each time that the host computer boots), both the Key Index Table 322 in the host's memory and the Key Table 318 in the Network Controller 316 are cleared. Each successive row in the host's Key Index Table 322 stores information concerning the corresponding entry in the Key Table 318. In particular, for each host-to-host key stored in the Key Table 318, the host computer retains identification data concerning the other host computer associated with that key, a destination address for that other host, a first KeyIndex value (shown as KeyIndexD in FIG. 6) indicating where in the Network Controller's Key Table the associated host-to-host key is stored, and a second KeyIndex value (shown as KeyIndexA/B/C in FIG. 6) indicates where the associated host-to-host key is stored in the Network Controller of the other the host computer. The first KeyIndex value is actually not included in the Key Index Table 322 since it is equal to the row number of the table 322, but is shown in FIG. 6 to make the data structure easier to understand.

During the exchange of host-to-host key information with another host computer, the KeyIndex value sent by Host D 114 identifies the first empty row of its Key Index Table 322.

When the host 114 establishes a host-to-host key (e.g., Host-to-Host Key AD in FIG. 6) with another host computer, each host downloads the host-to-host key into its own network controller 316, makes a corresponding entry in its Key Index Table 322 in the host's memory 206. Furthermore, to help ensure the security of the host-to-host key, both host computers A and D forget the agreed upon host-to-host key after storing it in their network controllers.

It should be noted that the host-to-host keys are stored only in the host controller's internal memory array 200, which is not accessible by the host computer 114 or any another host computer in the network. Securing the host-to-host keys in this way helps to prevent interlopers from obtaining copies of these keys, which would result in a breach in system security.

Encrypting and Transmitting Data Packets

The flow chart in FIG. 8 represents the steps performed in order for Host A 102 to send a data packet 130 to Host D. It is assumed at this point that the exchange of a host-to-host key by the two host computers has already been accomplished.

Referring to Step 326 of FIG. 8, whenever Host A transmits a data packet to another host computer i (using the packet transmitter 208 portion of the network controller 316), Host A constructs an unencrypted data packet in which field 138 of the packet header stores the KeyIndex value that identifies which slot in the other host computer's Key Table holds the key needed to decrypt the data packet. As before, a BQI value is stored in field 144. Host A sends to its network controller 316 the constructed (unencrypted) data packet, a Key Index value that identifies which slot in its own controller's Key Table 318 holds the key needed to encrypt the data packet, and the destination address for the data packet.

In step 328, the network controller 316 for Host A retrieves the Host-to-Host Key in its Key Table 318 identified by the specified Key Index received from its host. The packet transmitter (208) in Host A's network controller encrypts a portion 143 of the data packet using an encryption key computed by exclusive ORing the retrieved {Host-to-Host Key AD} with the data packet's BQI value 144, and then Host A's network controller 116 transmits the resulting data packet to Host D via the communications network.

Decrypting and Delivering Received Data Packets

The steps (214 and 216) for receiving the transmitted data packet and processing the BQI value in the received data packet are the same as in the first preferred embodiment. The next step 330, which is constructing the decryption key to be used to decrypt the received data packet, differs from the first preferred embodiment. In particular, the key logic circuit 332 within the control logic 230 retrieves from the Key Table 318 the host-to-host key identified by the KeyIndex value in field 138 of the received data packet. The key logic circuit 332 then computes the decryption key to be used with this packet by logically combining the retrieved host-to-host key value with the BQI value for the packet, using the same key generation function as the sending host's network controller:

Decryption key=(retrieved Host-to-Host Key) XOR BQI

Step 245 for decrypting the encrypted portions of the received data packet and delivering the decrypted data packet to the specified buffer queue in the host computer are the same as in the first preferred embodiment.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer network packet receiver, coupled to a first host computer and to a computer network from which data packets originated by other host computers are received, said computer network packet receiver comprising:

key storage means for storing a master key;

receiver means coupled to said computer network for receiving data packets, wherein each received data packet includes (A) a first, unencrypted portion in which is stored a buffer queue value corresponding to a memory address in said first host computer to which said data packet is to be delivered, (B) an encrypted host-to-host key, and (C) a second portion that is encrypted;

logic means, coupled to said receiver means and said key storage means, for (A) extracting from each received data packet said buffer queue value, (B) decrypting with said master key said encrypted host-to-host key in said each received data packet, and (C) generating a corresponding decryption key by computing a predefined combination of (1) said extracted buffer queue value and (2) said decrypted host-to-host key for said each received data packet;

packet processing means, coupled to said logic means, for decrypting said second portion of said each received data packet using said corresponding decryption key generated by said logic means, and for delivering said first portion and second decrypted second portion of said each received data packet to said memory address in said first host computer corresponding to said each received data packet's buffer queue value.

2. The network packet receiver of claim 1, each received data packet incorporating an embedded error checking value to enable error checking thereof;

said packet processing means including means for error checking said each received data packet as it is delivered to said first host computer.

3. The network packet receiver of claim 1, each received data packet incorporating an embedded error checking value to enable error checking thereof;

said packet processing means including pipelined decryption means and error checking means that, respectively, decrypt the encrypted portion of said each received data packet and error check said each received data packet as said each received data packet is delivered to said first host computer; wherein said packet processing means includes means for delivering portions of said each received data packet to said first host computer before said error checking means error checks other portions of said each received data packet.

4. The network packet receiver of claim 1, wherein said logic means generates said corresponding decryption key by exclusive ORing said extracted buffer queue value with said decrypted host-to-host key for said each received data packet.

5. A computer network packet receiver, coupled to a first host computer and to a computer network from which data packets originated by other host computers are received, said computer network packet receiver comprising:

key storage means for storing a distinct host-to-host key for each host computer from which said computer network packet receiver may receive data packets;

receiver means coupled to said computer network for receiving data packets, wherein each received data packet includes (A) a first, unencrypted portion in which is stored source identifying data indicating which other host computer originated said data packet and a buffer queue value corresponding to a memory address in said first host computer to which said data packet is to be delivered, and (B) a second portion that is encrypted;

logic means, coupled to said receiver means and said key storage means, for (A) extracting from each received data packet said buffer queue value, (B) retrieving from said key storage means the host-to-host key corresponding to the host computer that originated said each received data packet, and (C) generating a corresponding decryption key by computing a predefined combination of (1) said extracted buffer queue value and (2) said retrieved host-to-host key for said each received data packet;

packet processing means, coupled to said logic means, for decrypting said second portion of said each received data packet using said corresponding decryption key generated by said logic means, and for delivering said first portion and second decrypted second portion of said each received data packet to said memory address in said first host computer corresponding to said each received data packet's buffer queue value.

6. The network packet receiver of claim 5, each received data packet incorporating an embedded error checking value to enable error checking thereof;

said packet processing means including means for error checking said each received data packet as it is delivered to said first host computer.

7. The network packet receiver of claim 5, each received data packet incorporating an embedded error checking value to enable error checking thereof;

said packet processing means including pipelined decryption means and error checking means that, respectively, decrypt the encrypted portion of said each received data packet and error check said each received data packet as said each received data packet is delivered to said first host computer; wherein said packet processing means includes means for delivering portions of said each received data packet to said first host computer before said error checking means error checks other portions of said each received packet.

8. The network packet receiver of claim 5, wherein said logic means generates said corresponding decryption key by exclusive ORing said extracted buffer queue value with said retrieved host-to-host key for said each received data packet.

9. A computer network packet receiver, coupled to a first host computer and to a computer network from which data packets originated by other host computers are received, said computer network packet receiver comprising:

means for establishing a host-to-host key for each host computer from which said computer network packet receiver may receive data packets;

receiver means coupled to said computer network for receiving data packets, wherein each received data packet includes (A) a first, unencrypted portion in which is stored source identifying data indicating which other host computer originated said data packet and a buffer queue value corresponding to a memory address in said first host computer to which said data packet is to be delivered, and (B) a second portion that is encrypted;

logic means, coupled to said receiver means and said key storage means, including means for extracting from each received data packet said buffer queue value, means for determining said established host-to-host key corresponding to the host computer that originated said each received data packet, and decryption key generating means for generating a corresponding decryption key by computing a predefined combination of (1) said extracted buffer queue value and (2) said determined host-to-host key for said each received data packet;

packet processing means, coupled to said logic means, for decrypting said second portion of said each received data packet using said corresponding decryption key generated by said logic means, and for delivering said first portion and second decrypted second portion of said each received data packet to said memory address in said first host computer corresponding to said each received data packet's buffer queue value.

10. The network packet receiver of claim 9, wherein said logic means generates said corresponding decryption key by exclusive ORing said extracted buffer queue value with said determined host-to-host key for said each received data packet.

11. A computer system, comprising:

a multiplicity of host computers, each host computer having a corresponding network controller that couples said host computer to a common computer network;

means for establishing, for each pair of host computers of said multiplicity of host computers that will transmit data packets therebetween, a host-to-host encryption key;

each network controller including packet transmitting means for transmitting data packets, originated by its corresponding host computer, to other ones of said multiplicity of host computers via said computer network, and packet receiving means coupled to said computer network for receiving data packets;

wherein each transmitted data packet includes (A) a first, unencrypted portion in which is stored source identifying data indicating that said corresponding host computer originated said data packet and a buffer queue value corresponding to a memory address in a specified one of said multiplicity of host computers to which said data packet is to be delivered, and (B) a second portion that is encrypted;

said packet transmitting means of said each network controller including means for encrypting said second portion of each data packet transmitted thereby using an encryption key comprising a predefined combination of (1) said transmitted data packet's buffer queue value and (2) said established host-to-host encryption key corresponding to the pair of host computers comprising said originating host computer and said specified one of said multiplicity of host computers to which said data packet is being transmitted;

said packet receiving means of said each network controller including first logic means for extracting from each received data packet said buffer queue value, second logic means for determining said established host-to-host encryption key corresponding to the one of said multiplicity of host computers that originated said each received data packet, and decryption key generating means for generating a corresponding decryption key by computing said predefined combination of (1) said extracted buffer queue value and (2) said determined host-to-host encryption key for said each received data packet;

said packet receiving means of said each network controller further including packet processing means, for decrypting said second portion of said each received data packet using said corresponding decryption key generated by said decryption key generating means, and for delivering said first portion and second decrypted second portion of said each received data packet to said memory address in said network controller's host computer corresponding to said each received data packet's buffer queue value.

12. The computer system of claim 11,
each said transmitted data packet incorporating an embedded error checking value to enable error checking thereof;
each said packet receiving means including means for error checking said each received data packet as it is delivered to said network controller's host computer.

13. The computer system of claim 11,
each said transmitted data packet incorporating an embedded error checking value to enable error checking thereof;
said packet receiving means including pipelined decryption means and error checking means that, respectively, decrypt the encrypted portion of said each received data packet and error check said each received data packet as said each received data packet is delivered to said network controller's host computer; wherein said packet processing means includes means for delivering portions of said each received data packet to said first host computer before said error checking means error checks other portions of said each received packet.

14. The network packet receiver of claim 11, wherein said predefined combination of said extracted buffer queue value and said determined host-to-host encryption key for said each received data packet comprises said extracted buffer queue value exclusive ORed with said determined host-to-host key for said each received data packet.

15. A method of receiving at a first host computer data packets originated by other host computers and transmitted therebetween via a communications network, the steps of the method comprising:
receiving at said first host computer data packets from said communications network, wherein each received data packet includes (A) a first, unencrypted portion in which is stored a buffer queue value corresponding to a memory address in said first host computer to which said data packet is to be delivered, (B) an encrypted host-to-host key, and (C) a second portion that is encrypted;
extracting from each received data packet said buffer queue value;
decrypting, using a predefined master key, said encrypted host-to-host key in said each received data packet;
generating a decryption key corresponding to said each received data packet by computing a predefined combination of (1) said extracted buffer queue value and (2) said decrypted host-to-host key for said each received data packet;
decrypting said second portion of said each received data packet using said corresponding decryption key computed by said generating step, and delivering said first portion and second decrypted second portion of said each received data packet to said memory address in said first host computer corresponding to said each received data packet's buffer queue value.

16. The method of claim 15, said each received data packet incorporating an embedded error checking value to enable error checking thereof;
said method further including:
error checking said each received data packet as it is delivered to said first host computer; and
delivering portions of said each received data packet to said first host computer before said error checking step error checks other portions of said each received packet.

17. The method of claim 15,
said generating step including exclusive ORing said extracted buffer queue value with said decrypted host-to-host key for said each received data packet.

18. A method of receiving at a first host computer data packets originated by other host computers and transmitted therebetween via a communications network, the steps of the method comprising:
storing, in a memory device associated with said first host computer, a distinct host-to-host key for each other host computer from which said first host computer may receive data packets;
receiving at said first host computer data packets from said communications network, wherein each received data packet includes (A) a first, unencrypted portion in which is stored source identifying data indicating which other host computer originated said data packet and a buffer queue value corresponding to a memory address in said first host computer to which said data packet is to be delivered, and (B) a second portion that is encrypted;
extracting from each received data packet said buffer queue value;
retrieving from said memory device the host-to-host key corresponding to the other host computer that originated said each received data packet;
generating a decryption key corresponding to said each received data packet by computing a predefined combination of (1) said extracted buffer queue value and (2) said retrieved host-to-host key for said each received data packet;
decrypting said second portion of said each received data packet using said corresponding decryption key computed by said generating step, and delivering said first portion and second decrypted second portion of said each received data packet to said memory address in said first host computer corresponding to said each received data packet's buffer queue value.

19. The method of claim 18, said each received data packet incorporating an embedded error checking value to enable error checking thereof;
said method further including:
error checking said each received data packet as it is delivered to said first host computer; and
delivering portions of said each received data packet to said first host computer before said error checking step error checks other portions of said each received packet.

20. The method of claim 18,
said generating step including exclusive ORing said extracted buffer queue value with said retrieved host-to-host key for said each received data packet.

21. A method of receiving at a first host computer data packets originated by other host computers and transmitted therebetween via a communications network, the steps of the method comprising:
establishing a single host-to-host key for each host computer from which said first host computer may receive data packets;
receiving at said first host computer data packets from said communications network, wherein each received data packet includes (A) a first, unencrypted portion in which is stored source identifying data indicating which other host computer originated said data packet and a buffer queue value corresponding to a memory address in said first host computer to which said data packet is to be delivered, and (B) a second portion that is encrypted;

extracting from each received data packet said buffer queue value;

determining said established host-to-host key corresponding to the host computer that originated said each received data packet;

generating a decryption key corresponding to said each received data packet by computing a predefined combination of (1) said extracted buffer queue value and (2) said determined host-to-host key for said each received data packet;

decrypting said second portion of said each received data packet using said corresponding decryption key computed by said generating step, and delivering said first portion and second decrypted second portion of said each received data packet to said memory address in said first host computer corresponding to said each received data packet's buffer queue value.

22. The method of claim 21, said each received data packet incorporating an embedded error checking value to enable error checking thereof;

said method further including;

error checking said each received data packet as it is delivered to said first host computer; and delivering portions of said each received data packet to said first host computer before said error checking step error checks other portions of said each received packet.

23. The method of claim 21, said generating step including exclusive ORing said extracted buffer queue value with said determined host-to-host key for said each received data packet.

24. A method of transmitting data packets between a multiplicity of host computers via a communications network, the steps of the method comprising:

establishing, for each pair of host computers of said multiplicity of host computers that will transmit data packets therebetween, a host-to-host encryption key;

each host computer transmitting data packets to other ones of said multiplicity of host computers via said communications network; each transmitted data packet including (A) a first, unencrypted portion in which is stored source identifying data including an originating host computer, comprising a first one of said multiplicity of host computers that originated said data packet, and a buffer queue value corresponding to a memory address in a destination host computer, comprising a second one of said multiplicity of host computers to which said data packet is to be delivered, and (B) a second portion;

before transmitting each said data packet, encrypting said second portion of said each data packet using an encryption key comprising a predefined combination of (1) said each data packet's buffer queue value and (2) said established host-to-host encryption key corresponding to the pair of host computers comprising said originating host computer and said destination host computer associated with said each data packet;

upon receiving a data packet at any one of said multiplicity of host computers: extracting from each received data packet said buffer queue value; determining said established host-to-host encryption key corresponding to the one of said multiplicity of host computers that originated said each received data packet; generating a decryption key by computing a predefined combination of (1) said extracted buffer queue value and (2) said determined host-to-host encryption key for said received data packet; decrypting said second portion of said each received data packet using said generated decryption key; and delivering said received data packet, with said second portion decrypted, to said memory address in said network controller's host computer corresponding to said received data packet's buffer queue value.

25. The method of claim 24, each said data packet incorporating an embedded error checking value to enable error checking thereof;

said method further including:

error checking each said received data packet as it is delivered; and delivering portions of each said received data packet to said first host computer before said error checking step error checks other portions of each said received packet.

26. The method of claim 24, said generating step including exclusive ORing said extracted buffer queue value with said determined host-to-host key for said each received data packet.

* * * * *